Patented Aug. 18, 1931

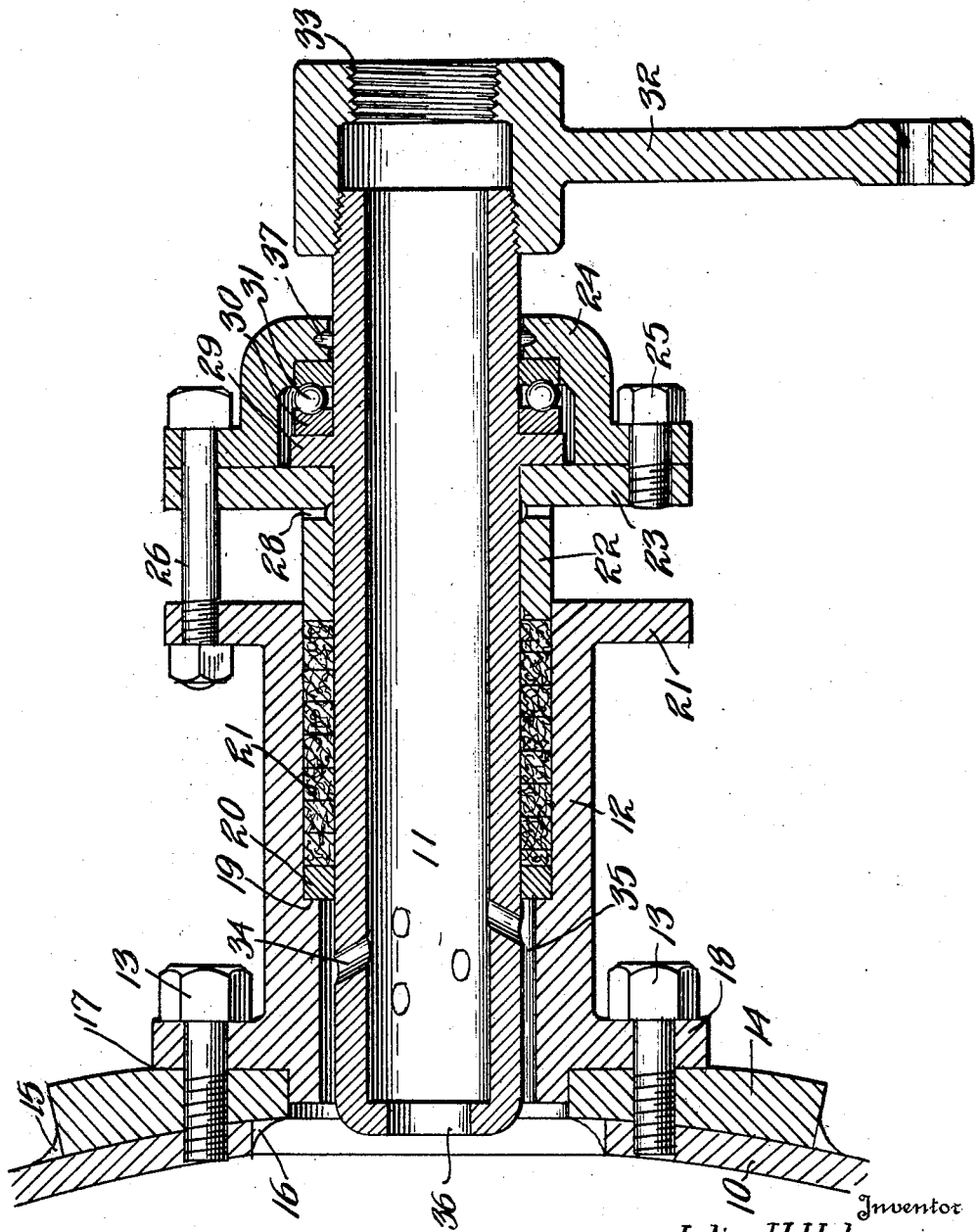

1,819,417

UNITED STATES PATENT OFFICE

JULIUS H. HOLMGREEN, OF SAN ANTONIO, TEXAS, ASSIGNOR TO ALAMO IRON WORKS, OF SAN ANTONIO, TEXAS, A CORPORATION OF TEXAS

JOINT PACKING

Application filed January 31, 1929. Serial No. 336,421.

This invention relates to joint packing used to insure against the entry of injurious substances.

More particularly, the invention relates to means for cleaning out and preventing the entry of injurious substances into the packing of a joint, and means for taking care of end thrust between the elements of the joint. The invention is designed particularly with a view to its use in a rotating drum in which abrasive materials are treated. In such systems ordinarily steam connections are made to the end of the drum or joints into which the abrasive elements frequently enter to cause destructive friction between the contacting elements of the joint and the drum.

An object of this invention is to provide structure whereby the steam which enters the drum may be so directed as to prevent the entry of the abrasive material into any of the bearing surfaces.

A further object of the invention is to provide in a joint of the kind just described means for taking up end thrust between the bearing and the rotating element carried thereon.

Other objects and advantages will become apparent as the description proceeds.

Referring to the accompanying drawing, which is made a part hereof and on which similar reference characters indicate similar parts.

The figure is a longitudinal section through the bearing, showing the joint packing.

In the drawing numeral 10 indicates a drum in which abrasive substances such for example as silicates may be treated, which is mounted to rotate about the sleeve 11 as an axis. The drum 10 is preferably mounted upon supporting elements, not shown, which may be, and preferably are, rollers, and the drum is caused to rotate by any suitable mechanism. Secured to an end of the drum is a stuffing box 12. This may be secured to the drum by means of bolts or screws 13. A gasket 14 may be welded to the end of the drum at 15 and 16, the gasket having a flat outer surface 17 against which a flange 18 on the stuffing box may rest. The stuffing box has an inner shoulder 19 against which a metallic packing ring 20 is pressed. Packing elements 21 are positioned about the sleeve 11 and held in position by means of a ring 22 having a flanged portion 23 which is secured to a cup plate 24 by means of bolts 25. The cup plate and the ring 22 are secured against axial movement by means of bolts 26 which pass through bores in the end of the flange 21 on the stuffing box 12. The ring 22 may be provided with oil passages 28. The sleeve 11 has intermediate its ends a flange 29 which bears against the outer edge of the flange 23 on one side and against a race 30 of ball bearing elements 31. The ring flange 29 takes care of end thrust of the sleeve 11 against the bearing elements just described.

The outer end of the sleeve 11 is fastened into an anchor arm 32 which arm may be secured to any suitable supporting elements, not shown. The end of the arm is screw-threaded at 33 to receive a steam pipe or other pipe connection through which steam is forced into the drum 10. The inner end of the sleeve has a series of perforations 34 in advance of the end, which open into an annular chamber 35 around the inner end of the sleeve. The sleeve itself also has a restricted opening 36 entering into the drum.

In operation the drum is rotatably mounted by any suitable means, and is driven by any suitable power mechanism, not shown, rotating about the sleeve 11 as an axis. Steam from a suitable connection passes through the interior of the sleeve 11 and enters the drum through the restricted opening 36. A portion of the steam passes out through the perforations 34 into the annular passage 35, thence into the interior of the drum. The passage of the steam through the perforations 35 is somewhat aided by means of the restricted opening 36. The annular sheet of steam issuing from the passage 35 prevents any abrasive material which may be contained in the drum from entering into the bearing elements 20 and 21. It will therefore clearly be seen that the ports 34 serve to admit steam at a point in the bearing where it will prevent any injurious elements from working into the bearing and packing elements around the sleeve 11. By means of the bolts 26 the packing elements 21 may be adjusted as desired. The cup 24 may of course be filled with lubricant and the inner portion of the cup may be provided with a groove 37 in which packing material may be secured to prevent the lubricant from leaking out past the end of the sleeve.

It will be obvious to those skilled in the art that various changes may be made in my device without departing from the spirit of the invention, and I, therefore, do not limit myself to what is shown in the drawing and described in the specification, but only as set forth in the appended claims.

Having thus fully described my said invention, what I claim as new and desire to secure by Letters Patent is:

1. A journal packing comprising a hollow sleeve provided with a restricted discharge end, a stuffing box, a plurality of packing elements between said sleeve and said stuffing box adapted to hold the sleeve and the stuffing box spaced from each other, a plurality of ports in said sleeve opening into the space between the sleeve and the stuffing box, means for passing fluid through said sleeve and said ports to maintain the space between the sleeve and the stuffing box free of foreign substances, substantially as set forth.

2. A journal packing comprising a stuffing box, a sleeve positioned in said stuffing box, a plurality of packing elements between said stuffing box and said sleeve for holding the sleeve centrally aligned in the stuffing box and positioned away from the inner surface of the stuffing box, a plurality of openings about the inner end of said sleeve adapted to deliver fluid into the space between the sleeve and the stuffing box, the sleeve having a restricted opening at its inner end to assist in directing the fluid through the said openings, substantially as set forth.

3. A journal packing comprising a hollow sleeve, a stuffing box having a recess therein to house a plurality of packing elements to centrally align said sleeve in said stuffing box, said sleeve having a plurality of ports therein adapted to convey steam in a direction to maintain the space between said sleeve and said stuffing box free from any injurious substances, and means for restricting the size of the discharge end of said sleeve to permit an increased flow through said ports, substantially as set forth.

In witness whereof, I have hereunto set my hand and seal at San Antonio, Texas, this twenty-eight day of January, A. D. nineteen hundred and twenty-nine.

JULIUS H. HOLMGREEN.